United States Patent [19]

Reuter et al.

[11] Patent Number: 5,753,726
[45] Date of Patent: May 19, 1998

[54] SYNTHESIS OF MODIFIED EPOXY RESINS FOR CATHODIC ELECTRODEPOSITION WITH CATALYST DEACTIVATION AND DIOL MODIFICATION

[75] Inventors: Hardy Reuter; Walter Jouck; Günther Ott, all of Münster, Germany

[73] Assignee: BASF Lacke + Farben, AG, Muenster-Hiltrup, Germany

[21] Appl. No.: 767,237

[22] Filed: Dec. 13, 1996

[51] Int. Cl.$^6$ .............................. C08K 3/20; C08L 63/00
[52] U.S. Cl. ..................... 523/402; 525/506; 525/523
[58] Field of Search ........................ 523/402; 428/413; 525/506, 523

[56] References Cited

U.S. PATENT DOCUMENTS

| | | | |
|---|---|---|---|
| 4,112,231 | 9/1978 | Weibull et al. | 544/174 |
| 4,393,181 | 7/1983 | Allen | 525/504 |
| 4,692,504 | 9/1987 | Frank | 528/365 |
| 4,704,331 | 11/1987 | Robins et al. | 428/414 |
| 4,795,791 | 1/1989 | Koenig et al. | 525/523 |
| 5,130,198 | 7/1992 | Swisher et al. | 428/391 |
| 5,358,982 | 10/1994 | Geisler et al. | 523/414 |
| 5,616,634 | 4/1997 | Pfeil et al. | 523/404 |

FOREIGN PATENT DOCUMENTS 6-033001   2/1994   Japan .

*Primary Examiner*—Randy Gulakowski

[57] ABSTRACT

Epoxy resins for preparing water-dispersible binders for cathodic electrodeposition coating materials, the epoxy resin being preparable by reacting a) polyepoxides having at least one glycidyl group per molecule b) and, optionally, up to 60% by weight, based on the overall epoxy resin reaction product, of aliphatic and/or alicyclic hydroxy compounds having preferably two or on average less than two hydroxyl groups per molecule and a molecular weight of less than 9000 g/mol, c) in the presence of a catalyst consisting of neutral metal salts, such as alkali metal salts and alkaline earth metal salts, zinc salts and nickel salts of tetrafluoroboric, tetrachloroboric, hexafluoro- antimonic, hexachloroantimonic,hexafluorophosphoric, perchlorate and periodic acid, and d) adding a deactivating agent which prevents the epoxy groups reacting further or effectively reduces the rate of such reaction as soon as the phenolic hydroxyl groups have already substantially reacted and at least 0.6% by weight of epoxy groups are still present, based on the overall weight of the epoxy resin reaction product.

13 Claims, No Drawings

SYNTHESIS OF MODIFIED EPOXY RESINS FOR CATHODIC ELECTRODEPOSITION WITH CATALYST DEACTIVATION AND DIOL MODIFICATION

The invention relates to epoxy resins for preparing water-dispersible binders for cathodic electrode-postition coating materials, to a process for preparing the epoxy resins, and to the use of the epoxy resins as binders for electrodeposition coating baths. The invention also relates to a process for the electrophoretic coating of an electrically conducting substrate connected as cathode, where the electrodeposition coating bath contains said epoxy resins.

Electrodeposition coating materials comprising cathodically depositable synthetic resins, and the cathodic electrodeposition coating process, in which the electrodeposition coating materials comprising cathodically depositable synthetic resins are employed, are sufficiently known (compare in this context, for example, Glasurit Handbuch Lacke und Farben, Curt R. Vincentz Verlag, Hanover, 1984, pages 374–384 and pages 457–462, and also DE-A-35 18 732, DE-A-35 18 770, EP-A-40 090, EP-A-12 463, EP-A-259 181, EP-A-433 783 and EP-A-262 069). The process is employed in particular for priming auto bodies. The cathodically depositable synthetic resins generally include nitrogen-basic synthetic resins, which can be cured with external crosslinking when a crosslinking agent is added, or else can be cured with autocrosslinking or by condensation.

In many cases these nitrogen-basic synthetic resins are reaction products of epoxy resins with amines, whereby dispersibility in water is obtained.

These epoxy resins are generally synthesized by reactions of epoxides with phenols and, if desired, alcohols in the presence of an amine catalyst, and in this context polyepoxides are often reacted with polyphenols and optionally polyfunctional alcohols and/or polyols, accompanied by chain extension. Thus, in the presence of an amine catalyst, for example, in DE-4325094 and DE-4332014 epoxy resins based on bisphenol A are reacted with monophenols and diphenols, accompanied by chain extension. Epoxy resins in which the amine-catalyzed synthesis takes place by reaction with alcohols, such as monoalcohols, diols, polyfunctional alcohols and polyols, such as polyester diols or polyether diols, are described in the patents EP-A-059 895, EP-A-154 724, DE-C- 27 01 002, U.S. Pat No. 4,104,147, U.S. Pat. No. 4,148,772, U.S. Pat. No. 3,839,252, U.S. Pat No. 4,035,275 and EP-A2-074 634. Through modifying the synthetic resins an attempt is made to take account of the requirements of the consumers for lower contents of organic solvents, greater coat thicknesses, and elasticized binders.

In principle, known catalysts for addition reactions of epoxide onto phenol and alcohol include not only amines but also catalysts, such as phosphines, alkali metal hydroxides, alkali metal iodides, alkali metal and alkaline earth metal fluoroborates, antimonates and perchlorates, which differ in their selectivity (U.S. Pat. No. 3,477,990, U.S. Pat. No. 0,189,480, U.S. Pat. No. 3,978,027, U.S. Pat. No. 4,358,578, DE 26 39 564 C2, DD 240 904 A1, DE 41 06 665 A1).

A significant disadvantage of the preparation of the epoxy resins resides in the deficient controllability of the chain-extending reactions:

In the reaction of epoxides (A) with alcohols and/or phenols (B), the following reactions take place:

1.) Opening of the oxirane ring by phenol or alcohol

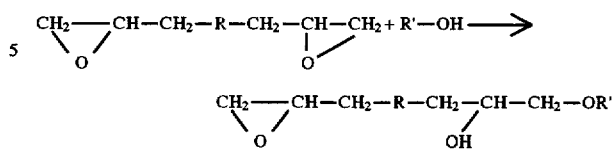

2.) Opening of a further oxirane ring by the secondary hydroxyl group formed in 1. (branching reaction)

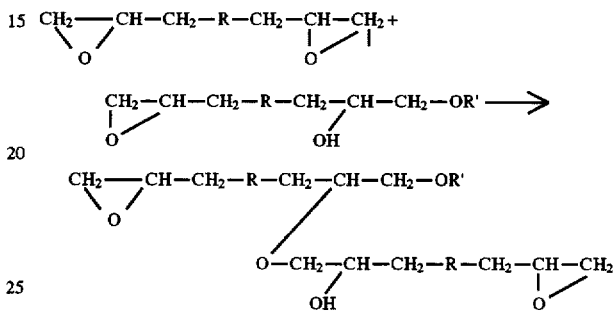

In addition to the desired reaction between phenolic hydroxyl groups, for example bisphenol A, or polymeric hydroxyl groups, for example of a polyetherdiol, with epoxy groups it is possible for the reaction described under 2., of the secondary hydroxyl group with the epoxy group, to take place. This described reaction is in fact exploited in order to form branched epoxy resins (DE-4325094 and DE-4332014). However, the branching reaction of the epoxy resin may, without careful supervision, lead to the development of excessive viscosities, through to gelling of the resin.

A particular problem which is found is the stopping of the reaction, since in general the branching reaction is interrupted by lowering the reaction temperature. During the cooling phases of viscous media, the uncontrolled chain extension cannot be prevented in this way. With the aid of ballast cooling and/or vacuum evaporative cooling, it is possible to reduce the product temperature of viscous resins, but this does not prevent the uncontrolled chain extension and does require considerable process times in addition. Consequently, these described disadvantages occur in particular in the course of industrial production. The avoidance of ballast cooling and/or vacuum evaporative cooling, which is aimed at in the case of solvent-free systems, leads in general to intolerable impairments in properties of the product, since rapid cooling is impossible on the production scale.

On the other hand, during chain extension so many epoxy groups may be consumed that an excess of amine remains in the reaction product, which has a persistent adverse effect on the dispersion and application properties into the resulting resin.

In the reaction of aliphatic and/or cycloaliphatic hydroxy compounds with epoxide, the efficiency of conversion may be low. Even if the content of epoxy groups in such epoxy resin precursors, in accordance with assumed addition of epoxy onto an alcohol, corresponds to the theoretical content calculated beforehand, self-condensation of the epoxy resins means that it is not possible to rule out the presence of considerable proportions of free alcohols, owing to their incomplete incorporation of the resin.

In the literature, the great product diversity of epoxy resin oligomers which are formed demonstrates the low selectivity of the amine-catalyzed reaction of epoxide with aliphatic hydroxy compounds. Byproducts are produced. Broad molecular weight distributions are produced. Especially when alcohols such as diols, are incorporated into epoxy resins, a relatively great influence of the reaction temperature on the selectivity thereof is observed, which leads inter alia to a differing gelling behavior and overall to more heterogeneous networks (W. Tänzer, J. Eisenschmidt M. Fedke—Polymer Bulletin 20, 183–188 (1988); W. Tanzer, M. Szesztay, Zs. Laszlo-Hedvig, M. Fedke—Polymer Bulletin 20, 189–194 (1988); W. Tänzer, M. Szesztay, Zs. Laszlo-Hedvig, M. Fedke—Acta Polymerica 39 (1988) No. 12; 696–701).

Furthermore, in the course of long storage at room temperature of epoxy resins which have been synthesized previously by amine-catalyzed chain extension, further epoxy groups are consumed.

The object of the invention was to discover an epoxy resin for preparing water-dispersible binders for cathodic electrodeposition coating materials, which resin can be prepared with improved reproducibility, and using which the deficiencies set out initially are avoided.

This object is achieved according to the invention in that the epoxy resin can be prepared by reacting a) polyepoxides having at least one glycidyl group per molecule of the epoxy groups b) and, optionally, up to 60% by weight, based on the overall epoxy resin reaction product, of aliphatic and/or alicyclic hydroxy compounds having preferably two or on average less than two hydroxyl groups per molecule and a molecular weight of less than 9000 g/mol, c) in the presence of a catalyst consisting of neutral metal salts, such as alkali metal salts and alkaline earth metal salts, zinc salts and nickel salts of tetrafluoroboric, tetrachloroboric, hexafluoroantimonic, hexachloroantimonic, hexafluorophosphoric, perchlorate and periodic acid, and d) adding a deactivating agent which prevents the epoxy groups reacting further as soon as the phenolic hydroxyl groups have already substantially reacted and at least 0.6% by weight of epoxy groups are still present, based on the overall weight of the epoxy resin reaction product.

The epoxy resin is preferably modified by reacting (A) an epoxy resin and (B) primary, secondary and/or tertiary amines, the residual content of epoxide groups in (A) for the reaction with the amines (component B) being chosen so as to ensure sufficient dispersibility in water. The reaction product can then be rendered dispersible in water by treatment with acids.

Epoxy resins which can be used in the present invention are all low molecular mass and higher molecular mass polymers, provided they contain on average more than one epoxy group per molecule. Preferred epoxy compounds are those having two or more epoxy groups per molecule. The preferred epoxides are polyglycidyl ethers of cyclic polyols. The particularly preferred epoxides are polyglycidyl ethers of polyphenols such as bisphenol A or bisphenol F. These polyepoxides can be prepared in a known manner by etherifying a polyphenol with an epihalohydrin or a dihalohydrin, such as epichlorohydrin or dichlorohydrin, in the presence of alkali. Examples of polyphenols are 2,2-bis(4-hydroxyphenyl)-propane, 1,1-bis-(4-hydroxyphenyl)ethane, 2-methyl-1,1-bis(4-hydroxyphenyl)propane, 2,2-bis(4-hydroxy-3-tertbutylphenyl)propane, bis-(2-hydroxynaphthyl)methane and 1,5-dihydroxynaphthalene. Examples of other cyclic polyols are cycloaliphatic polyols, such as 1,2-cyclohexanediol, 1,4-cyclohexanediol, 1,2-bis (hydroxymethyl)-cyclohexane, 1,3-bis(hydroxymethyl) cyclohexane and hydrogenated bisphenol A. Furthermore, it is also possible to use alkoxylated adducts, such as ethylene oxide and propylene oxide adducts of these alicyclic polyols and polyphenols. Polyglycidyl ethers of polyhydric alcohols such as ethylene glycol, diethylene glycol, triethylene glycol, 1,2-propylene glycol, 1,3-propylene glycol, 1,4-butylene glycol and 1,5-pentanediol can be regarded as examples of other epoxy resins. Another suitable class of epoxy resins are polyglycidyl ethers of phenolic novolak resins or similar phenolic resins. Epoxides obtained by epoxidation of an olefinically unsaturated alicyclic compound can also be used in the invention. Epoxy resins of this kind include diepoxides or higher epoxides and also mixtures thereof containing one or more monoepoxides. These epoxides are nonphenolic and are obtained by epoxidation of alicyclic olefins, for example with oxygen and selected metal catalysts, with percompounds, for example perbenzoic acid, with acetaldehyde monoperacetate or peracetic acid. Examples of such epoxides are 1,5-diepoxycyclooctane and isomers of cyclopentadiene dioxide. This applies in the same way for the partial epoxidation of polydienes and copolymers thereof. Examples are partially epoxidized polybutadiene and polyisoprene.

As phenols it is possible to use monophenols and/or polyphenols, including alkyl- and alkoxy-substituted phenols. Examples of monophenols are phenol, 2-hydroxytoluene, 3-hydroxytoluene, 4-hydroxytoluene, 2-tert-butylphenol, 4-tert-butylphenol, 2-tert-butyl-4-methylphenol, 2-methoxyphenol, 4-methoxyphenol, 2-hydroxybenzyl alcohol, 4-hydroxybenzylalcohol, nonylphenol, dodecylphenol, 1-hydroxynaphthalene, 2-hydroxynaphthalene, biphenyl-2-ol, biphenyl-4-ol and 2-allylphenol. Bisphenol A or bisphenol F, for example, are regarded as typical representatives of polyphenols. Examples of further polyphenols are 1,4-dihydroxybenzene, 1,3-dihydroxybenzene, 1,2-dihydroxybenzene, 2,2-bis-(4-hydroxyphenyl)propane, 1,1-bis-(4-hydroxyphenyl)-ethane, 2-methyl-1,1-bis(4-hydroxyphenyl)propane, 2,2-bis(4-hydroxy-3-tert-butylphenyl)propane, 4,4-dihydroxybenzophenone, 2,4-dihydroxybenzophenone, 1,4-dihydroxynaphthalene, bis(2-hydroxynaphthyl)methane and 1,5-dihydroxynaphthalene.

The process of synthesis from an epoxy resin and a phenol, which then leads to the polyepoxide (a), is accomplished via a type of reaction which is known in principle in the art and which is, for example, also occasionally used in the production of commercial epoxy resins of bisphenol A or bisphenol F type. In this process, a reaction takes place between the epoxy groups and the phenolic hydroxyl groups which, given chosen catalysis, proceeds substantially without side reactions. For this purpose, an epoxy resin based on bisphenol A or F and a phenol are typically reacted in the presence of an appropriate catalyst, such as triphenylphosphine, or of a phosphonium salt, for example ethyltriphenyl-phosphonium iodide. This can take place in the absence (separately) or, optionally, presence of the aliphatic and/or cycloaliphatic hydroxy compounds (in situ), at temperatures of from 80° to 200° C., preferably from 100° to 150° C.

All monoalcohols, diols, triols and polyols are suitable in principle for reaction with aliphatic and/or cycloaliphatic hydroxy compounds, suitable temperatures being from 80° to 200° C., preferably from 100° to 150° C.

In the case of useful cathodic electric deposition coating materials, the incorporation of the hydroxy compounds produces binders which are notable for additional flexibilization. In addition, the formation of thicker coating films is promoted, or, respectively, the losses which can commonly be observed in the coat thicknesses with simultaneously a lower nonvolatile content and/or a reduction in the content of plasticizer are compensated. Suitable monoalcohols are methanol, ethyl, propyl, isopropyl, butyl, isobutyl, amyl, isoamyl, 2-ethylbutyl, hexyl, heptyl, octyl, 2-ethylhexyl, nonyl, 3,3,5-trimethylhexyl, isononyl, decyl, isodecyl, lauryl, isotridecyl, isohexadecyl, isooctadecyl and neopentyl alcohol, 3,7-dimethyl-3-octanol, 3-cyclohexylpropanol and 2,4-dimethylpentan-3-ol. Also suitable are unsaturated monoalcohols such as allyl alcohol, 1-buten-3-ol, 2-methyl-3-buten-2-ol, 3-methyl-1-pentan-3-ol, crotyl alcohol, 9-decen-1-ol, cinnamyl alcohol and 9-octadecen-1-ol. Further suitable alcohols are benzyl alcohol, 1-phenylethanol, 2-phenylethanol, 4-methylbenzyl alcohol, 2-phenyl-1-propanol, diphenylcarbinol and phenylmethylcarbinol. Furthermore, cycloaliphatic alcohols, such as cyclopentanol, cyclohexanol and 4-tert-butylcyclohexanol, are suitable. Suitable ether alcohols are methylglycol, ethylglycol, butylglycol, methyl-, ethyl- and butyldiglycol, methyl-, ethyl- and butyltriglycol, methyl-, ethyl- and butylpolyglycol and also hexylglycol, hexyldiglycol, phenylglycol, phenyldiglycol, methoxypropanol, methoxybutanol, phenoxy-propanol and phenoxybutanol.

In addition to the low molecular mass ether alcohols, use is made of polyoxyalkylenemonools corresponding to the general formula:

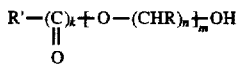

In this formula R' is an alkyl, aryl, mixed alkyl/aryl or alkoxy radical, with or without substituents, and k is 0 or 1. R is hydrogen or a lower alkyl radical, with or without various substituents, where n is 1 to 6 and m is 1 to 50 or more. Examples are monoalcohols of polyoxymethylene, polyoxyethylene, polyoxypropylene and polyoxytetramethylene, as represented, for example, by polyoxypropylenes bearing the designation Tegomer® H-3304 (from Th. Goldschmidt AG). However, ethoxylated or propoxylated alkylphenols are also suitable, such as, for example, TRITON® X-15, TRITON® X-35 or TRITON® X-405 (from Rohm and Haas) and PLASTILIT® 3060 (from BASF AG). The preferred molecular weights are in the range from 350 to 6000 g/mol.

Suitability extends past polyoxyalkylene glycols to embrace monofunctional oligomers with a terminal hydroxyl group based on polybutadiene, polyisoprene, the copolymers of butadiene and isoprene, the copolymers of butadiene or isoprene with styrene, the copolymers of butadiene, isoprene and styrene, and their hydrogenated or partially hydrogenated polymers, especially block copolymers of the types mentioned. Typical representatives are KRATON® HPVM-1101, 1202, KRATON® HPVM-1301 (from Shell).

Diols which are generally preferred for use are alkylene glycols such as ethylene glycol, diethylene glycol, triethylene glycol, tetraethylene glycol, propylene glycol, dipropylene glycol, butylene glycol and neopentylglycol. Also preferred are: propane-1,2-diol, propane-1,3-diol, butane-1,4-diol, butane-1,3-diol, 2-butyne-1,4-diol, hexane-1,6-diol, decane-1,10-diol, 1,4-cyclohexanediol, 1,2-cyclohexanediol, 1-phenyl-1,2-ethanediol and tetraphenyl-1,2-ethanediol.

In addition to the low molecular mass diols, use is made of polyoxyalkylene glycols according to the general formula:

R is hydrogen or a lower alkyl radical, with or without various substituents, n is 1 to 6 and m is 3 to 50 or even higher. Examples are polyoxymethylene, polyoxyethylene, polyoxypropylene, and polyoxytetramethylene glycols, such as, for example, polyoxyethylene glycol and polyoxypropylene glycol PLURIOL® E400, P900, P2000 (from BASF AG). In addition, copolymers thereof are also suitable, especially block copolymers, such as block copolymers of ethylene oxide and propylene oxide, for example PLURONIC® PE3100, PE6100 (from BASF AG). The preferred molecular weights are in the range from 350 to 6800 g/mol.

In addition to polyoxyalkylene glycols, suitability extends to difunctional oligomers having terminal hydroxyl groups, based on polybutadiene, polyisoprene, the copolymers of butadiene and isoprene, the copolymers of butadiene or isoprene with styrene, the copolymers of butadiene, isoprene and styrene, their hydrogenated or partially hydrogenated polymers, especially block copolymers of the types mentioned. Typical representatives are R 45HT (from Metallgesellschaft AGPB), KRATON® HPVM-2202, KRATON® WRC-91-102 (from Shell).

Polyfunctional aliphatic and/or cycloaliphatic hydroxy compounds are likewise suitable for preparing the epoxy resin reaction product (A), perceived examples of such compounds being trimethylolpropane, 1,2,6-hexanetriol, pentaerythritol, dipentaerythritol, tripentaerythritol, polypentaerythritol, methylglucoside, saccharose and the reaction products thereof with ethylene or propylene oxide or mixtures, for example ethoxylated or propyloxylated trimethylolpropane (POLYOL® TP08, TP30; TS30, from Perstorp Polyols), ethoxylated or propoxylated pentaerythritol (POLYOL® PP30, PP50, PS 50, from Perstorp Polyols).

The branching reactions and optionally the addition of aliphatic and/or cycloaliphatic hydroxy compounds (b) onto the polyepoxide (a) take place in the presence of neutral metal salts with a combination of "hard" cation with "nonnucleophilic" anion. Suitable groups of such catalysts (c) are alkali metal salts and alkaline earth metal salts, zinc salts and nickel salts of tetrafluoroboric, tetrachloroboric, hexafluoroantimonic, hexachloroantimonic, hexafluorophosphoric, perchlorate and periodic acid.

Suitable neutral metal salts are preferably alkali metal and alkaline earth metal, zinc and nickel perchlorates or fluoroborates. Particular preference is given to alkaline earth metal and zinc perchlorates. The quantity in which the catalysts are employed in accordance with the invention may vary within a broad range. The catalysts (c) are employed in proportions of 1–5200 parts, based on the proportion of perchlorate, preferably 100–1900 parts per million parts of polyepoxide (a). In the presence of the catalyst (c), the process which forms the subject of the invention is conducted such that the reaction takes place at a temperature of from 80° to 200° C., preferably from 100° to 150° C. The catalysts (c) used in accordance with the invention not only accelerate the branching reactions and, optionally, the addition of aliphatic and/or cycloaliphatic hydroxy compounds (b) but also result in a more favorable molecular distribution of the reaction product without the formation of unwanted byproducts. This differing selectivity toward amine-catalyzed systems leads to an altered oligomer distribution. The higher selectivity of the metal salt-catalyzed reaction is evident, inter alia, in the differing gelling behavior of the epoxy resins described here and in the formation of overall more homogeneous networks. The catalyst chosen in accordance with the invention improves the efficiency of the incorporation of aliphatic and/or cycloaliphatic hydroxy compounds. These differences relative to the amine-catalyzed reaction lead to a more favorable application behavior of the electro-deposition coating materials produced therefrom and influence the properties of the polymer network which is formed after stoving.

In order effectively to reduce the further reaction of the branching reactions or their rate to a point at which the phenolic hydroxy groups have already substantially reacted, and at which at least 0.6% by weight of epoxy groups are still present, based on the overall weight of nonvolatile fractions of the epoxy resin (A), it is essential to the invention to add a deactivating agent (d) to the reaction mixture. This may take place at temperatures above 80° C., preferably above 100° C., particularly preferably above 120° C., where otherwise, without the addition, it is possible to observe a rapid further reaction. With addition of the deactivating agent, the cooling steps which normally follow the synthesis reaction become unproblematical. In other words, rapid cooling of the epoxy resin reaction product (A) at the preferred temperatures for the chain synthesis of from 100° to 150° C. is not absolutely necessary. Thus under conditions of industrial production it is possible to obtain simple control of the synthesis of the molecule even without effective reduction of the reaction temperature by means, for example, of ballast cooling or vacuum evaporated cooling. The deactivating agents employed are metal hydroxides of main groups I–V and subgroups II–VIII of the Periodic Table. Examples of suitable metal hydroxides are lithium, sodium, potassium, cesium, magnesium, calcium, strontium, barium, aluminum, tin, lead, bismuth, zinc, chromium, manganese, iron and nickel hydroxide. It is preferred to use lithium, sodium, potassium, cesium, magnesium, calcium, strontium and barium hydroxides, particularly preferably sodium and potassium hydroxide. In this context the addition of the metal hydroxides in the disperse or dissolved state has an advantageous effect, but is not a necessary precondition of their incorporation. Dispersing them or dissolving them in the plasticizers and solvents which are prepared for the subsequent use of electrodeposition coating materials, such as alcohols, ether alcohols, for example butyl glycol, and plasticizers based on ethoxylated and propoxylated phenols, for example Plastilit 3060 (propylene glycol compound from BASF), is particularly advantageous. The amount of deactivator may vary greatly depending on the specific deactivator (d), catalyst (c), polyepoxide (a) and, optionally, aliphatic and/or cycloaliphatic hydroxy compounds (b), on the reaction conditions and on the degree of deactivation. In order effectively to reduce further reaction or its rate, an addition is made of from 0.5 to 5.0 mol, preferably 1.4–3.0 mol, of hydroxide ions of the metal hydroxides described in each case to one mole of "nonnucleophilic" anions, such as tetrafluoroborate, tetrachloroborate, hexafluoroantimonate, hexachloroantimonate, hexafluorophosphate, perchlorate and periodate.

For the use of the novel epoxy resin reaction products (A) in aqueous systems it is necessary to introduce ionic groups into the resins. Thus by means of suitable measures it is possible to introduce acid groups which, following neutralization with amines, give rise to a water-soluble resin.

For the widespread electrodeposition coating of metallic substrate, cathodic electrodeposition coating is preferably employed. In this technique, the resin has positive charges. To this end, the epoxy resin reaction product (A) is reacted with amines (B) and the positive charges are generated by subsequent neutralization with carboxylic acids. As component (B) it is possible to employ primary, secondary and tertiary amines or mixtures thereof. Primary and secondary amines can be added on directly to the epoxide ring. Tertiary amines can be incorporated into the molecule only by way of a further functional group. The amine should preferably be a water-soluble compound. Examples of such amines are mono- and dialkylamines such as methylamine, ethylamine, propylamine, butylamine, dimethylamine, diethylamine, dipropylamine, methylbutylamine and the like. Also suitable are alkanol amines, for example methylethanolamine, diethanolamine and the like. Dialkylaminoalkylamines are also suitable, for example dimethylaminoethylamine, diethylaminopropylamine, dimethylaninopropylamine and the like. It is also possible to employ amines containing ketimine groups, such as, for example, the methyl isobutyl diketimine of diethylenetriamine. In the majority of cases use is made of low molecular mass amines, although it is also possible to employ monoamines of higher molecular mass. Similarly, mixtures can also be used. Polyamines with primary and secondary amino groups can be reacted in the form of their ketimines with the epoxy groups. The ketimines are prepared from the polyamines in a known manner. The amines may also, in addition, contain other groups, although these groups should not interfere with the reaction of the amine with the epoxide group and should also not lead to gelling of the reaction mixture.

Preference is given to employing primary and secondary amines as component (B).

The reaction of the amine with the epoxy group-containing epoxy resin reaction product (A) in many cases takes place as soon as the material are mixed. However, heating to elevated temperatures may optionally be desirable, for example at from 50° to 150° C., although reactions at lower and higher temperatures are also possible. For the reaction with the epoxy group-containing epoxy resin (A), the amount of amine used should be at least such that the resin acquires a cationic character; in other words, such that under the influence of a voltage in the coating bath it migrates to the cathode if it has been rendered soluble by addition of an acid.

The charges required for dilutability in water and electrical deposition can be generated by protonation using water-soluble acids (for example boric acid, formic acid, lactic acid, propionic acid, preferably acetic acid). In general it is only necessary to add an amount of acid such that the product can be dispersed in water. However, it is also possible to add so much acid that the theoretical degree of neutralization of 100% is exceeded. A further possibility for the introduction of cationic groups consists in the reaction of epoxide groups with amine salts. As the salt of an amine, the salt of a tertiary amine can be used. The amine moiety of the amine-acid salt is an amine which may be unsubstituted or substituted, as in the case of hydroxyl amine, and in this context these substituents should not interfere with the reaction with the epoxy group of the epoxy resin reaction product (A), and the reaction mixture should not gel. Preferred amines are tertiary amines, such as dimethylethanolamine, triethylamine, trimethylamine, triisopropylamine and the like. The amine-acid salt mixture is obtained in a known manner by reacting the amine with the acid. It is also possible to use amine-acid mixtures, although in general they react to form the acid salt.

The cathodically depositable synthetic resins present in the novel electrodeposition coating materials are generally either autocrosslinking and/or are combined with a crosslinking agent or with a mixture of crosslinking agents.

Autocrosslinkable synthetic resins are obtainable by introducing into the synthetic resin molecules reactive groups which react with one another under stoving conditions. For example, into hydroxyl- and/or amino-containing synthetic resins it is possible to introduce blocked isocyanate groups which unblock under stoving conditions and react with the hydroxyl and/or amino groups to form crosslinked coating films. Autocrosslinkable synthetic resins can be obtained, for example, by reacting a hydroxyl- and/or amino-containing synthetic resin with a partially blocked polyisocyanate containing on average one free NCO group per molecule.

The novel electrodeposition coating materials may in principle contain all crosslinking agents which are suitable for electrodeposition coating materials, such as, for example, phenolic resins, polyfunctional Mannich bases, melamine resins, benzoguanamine resins, blocked polyisocyanates and compounds containing activated ester groups. It is preferred to employ blocked polyisocyanates as crosslinking agents. In the case of the invention it is possible to use any polyisocyanates in which the isocyanate groups have been reacted so that the blocked polyisocyanate formed is stable at room temperature toward hydroxyl groups and amino groups but reacts at elevated temperature, in general in the range from about 90° to about 300° C. In the course of the preparation of the blocked isocyanates it is possible to use any organic di- or polyisocyanates suitable for crosslinking, such as, customarily, aliphatic, cycloaliphatic or aromatic isocyanates. These can also be prepolymers which are derived, for example, from a polyol, including polyetherpolyol or polyesterpolyol.

The isocyanates can be blocked with all known blocking agents, such as alcohols, phenols, oximes, lactams, alkanolamines, secondary amines and aromatic alcohols, as is described at length in patent documents cited at the outset (DE-A-35 18 732, DE-A-5 18 770, EP-A-40 090, EP-A-12 463, EP-A-259 181, EP-A-433 783, EP-A-262 069).

The nonvolatile fraction of the novel electro-deposition coating materials consists to the extent of from 35 to 100% by weight, preferably from 35 to 90% by weight, of a cathodically depositable synthetic resin or of a mixture of cathodically depositable synthetic resins, and to the extent of from 0 to 65% by weight, preferably from 10 to 65% by weight, of crosslinking agent.

In addition to the components described above the novel aqueous electrodeposition coating materials may also include further customary coating-material constituents, examples being organic solvents, pigments, fillers, wetting agents, anticrater additives, etc.

The solids content of the novel electrodeposition coating materials is generally from 5 to 40, preferably from 10 to 40, and, with particular preference, from 20 to 40 percent by weight.

The novel electrodeposition coating materials are used to coat electrically conductive substrates, where (1) the electrically conductive substrate is immersed in an aqueous electrodeposition coating material, (2) the substrate is connected as cathode, (3) by means of direct current, a film is deposited on the substrate, (4) the coated substrate is removed from the electrodeposition coating material, and (5) the deposited coating film is stoved.

The above-described process is known and has been widely employed for a number of years (compare also the patent documents cited above). The applied voltage may vary within a wide range and can, for example, be between 2 and 1000 V. Typically, however, voltages of between 50 and 500 V are operated. The current density is in general between about 10 and 100 A/m$^2$. In the course of deposition, the current density tends to drop. As soon as the coating film has been deposited on the substrate, the coated substrate is removed from the electrodeposition coating material and rinsed. The deposited coating film is subsequently stoved. The stoving temperatures are usually from 90° to 200° C., preferably from 150° to 180° C., and the period of stoving is in general between 10 and 60 minutes, preferably between 15 and 30 minutes.

Using the above-described process it is possible in principle to coat all electrically conductive substrates. Examples of electrically conductive substrates are substrates of metal, such as steel, aluminum, copper and the like.

The invention is illustrated in more detail in the examples which follow. All parts and percentages are by weight unless expressly stated otherwise.

1. Preparation of crosslinking agents A 1.1
Crosslinking agent A1

10,462 parts of isomers and oligomers of higher functionality based on 4,4'-diphenylmethane diisocyanate, having an NCO equivalent weight of 135 g/eq (Lupranat® M20S, from BASF; NCO functionality about 2.7; content of 2,2'- and 2,4'-diphenylmethane diisocyanate less than 5%) are charged under nitrogen to a reactor equipped with a stirrer, ref lux condenser, internal thermometer and inert gas inlet. 20 parts of dibutyltin dilaurate are added, and 9626 parts of butyldiglycol are added dropwise at a rate such that the product temperature remains below 60° C. Cooling may be necessary. After the end of the addition, the temperature is held at 60° C. for 60 minutes more and a NCO equivalent weight of 1120 g/eq is determined (based on solids). After dilution in 7737 parts of methyl isobutyl ketone and addition of 24 parts of dibutyltin dilaurate, 867 parts of melted trimethylolpropane are added at a rate such that the temperature of the product does not exceed 100° C. After the end of the addition, reaction is allowed to continue for 60 minutes more. In the course of subsequent checking, NCO groups can no longer be detected. The batch is cooled to 65° C. and is simultaneously diluted with 963 parts of n-butanol and 300 parts of methyl isobutyl ketone. The solids content is 70.1% (1 h at 130° C.).

1.2 Crosslinking agent A2

In a reactor as described in the previous example, 1464 parts of trimerized hexamethylene diisocyanate having an NCO equivalent weight of 191 g/eq ("Basonat® PLR 8638" from BASF) and 510 parts of methyl isobutyl ketone are heated under nitrogen and with stirring to 50° C. Then 936 parts of di-n-butylamine are added dropwise over the course of 4 h, during which the temperature is maintained by cooling below 55° C. The crosslinking agent solution is subsequently cooled and diluted with 90 parts of n-butanol. In the course of subsequent checking, NCO groups can no longer be detected. The solids content is 79.8% (measured after 1 h at 130° C.).

2. Preparation of an epoxy resin reaction product
2.1 Amine-catalyzed epoxy resin reaction product
2.1.1 Epoxy resin reaction product B0

(Comparison example to the perchlorate catalysis, described in Section 2.2.1, with subsequent catalyst deactivation (B1))

In a reactor equipped with a stirrer, reflux condenser, internal thermometer and an inert gas inlet, 19,160 parts of epoxy resin based on bisphenol A, having an epoxy equivalent weight (EEW) of 188 g/eq, are heated to 130° C. together with 4357 parts of bisphenol A, 4179 parts of dodecylphenol and 1392 parts of xylene, under nitrogen and with stirring.

29 parts of triphenylphosphine are added. The batch is held at 130° C. for 45 minutes so that the phenolic hydroxyl groups react completely. An EEW of 581 g/eq is determined (based on solids).

Then 81 parts of N,N-dimethylbenzylamine are added. The reaction batch is held at this temperature until the EEW has reached a value of 758 g/eq (based on solids). The batch is then divided and the first half of the epoxy resin reaction product B0 thus prepared is discharged, and is cooled as rapidly as possible to room temperature.

After a further 180 minutes, an EEW of 874 g/eg is determined for the portion which remains in the reactor—after a further 575 minutes the EEW is 1300 g/eq. Immediately after the sampling procedure, gelling occurs.

The sample found to have an EEW of 758 g/eq which was removed from the reactor previously was dissolved at room temperature in tetrahydrofuran directly after sampling, so that the number-average and weight-average molecular mass—relative to a calibration with polystyrene standards—could be determined by means of size exclusion chromatography (SEC):
Mn=1610 g/mol (SEC, relative to polystyrene standards)
Mw/Mn=4.8 (SEC, relative to polystyrene standards)

In a gelling batch modified relative to the above batch, N,N-dimethylbenzylamine was used instead of triphenylphosphine to initiate the chain synthesis reaction. Triphenylphosphine itself was not added. Samples were taken for EEW determination at 130° C. and at 30-minute intervals. Immediately after reaching an EEW of 1250 g/eq (based on solids), the comparison batch gels.

2.2. Perchlorate-catalyzed epoxy resin reaction product 2.2.1 Epoxy resin reaction product B1

In a reactor equipped with a stirrer, reflux condenser, internal thermometer and an inert gas inlet, 19,160 parts of epoxy resin based on bisphenol A, having an-epoxy equivalent weight (EEW) of 188 g/eq, are heated to 130° C. together with 4357 parts of bisphenol A, 4179 parts of dodecylphenol and 1392 parts of xylene, under nitrogen and with stirring.

29 parts of triphenylphosphine are added. The batch is held at 130° C. for 45 minutes so that the phenolic hydroxyl groups react completely. An EEW of 583 g/eq is determined (based on solids).

Subsequently, 40 parts of magnesium perchlorate dihydrate (Fluka Chemie AG), dissolved at room temperature in 191 parts of methyl isobutyl ketone, are added and the batch is conditioned at 130° C.

125 minutes after adding the magnesium perchlorate solution, the batch is divided into two portions. In both portions of the reaction batch, an EEW of 755 g/eg is determined (based on solids).

To the first half (14,674 parts) there are added 8 parts of potassium hydroxide, dissolved at room temperature in 319 parts of butylglycol, and the batch is held at 130° C. 300 minutes following the addition of potassium hydroxide solution, the epoxy resin reaction product B1 thus prepared is discharged. An EEW of 757 g/eq is determined, so that the number of epoxy groups has remained virtually unchanged.

In the second half of the reaction batch conditioned at 130° C., in which no deactivation of the magnesium perchlorate catalyst has taken place, an EEW of 1070 g/eq is found after 235 minutes. Immediately after sampling, the reaction batch gels.

The sample found to have an EEW of 755 g/eq which was removed from the reactor previously was dissolved at room temperature in tetrahydrofuran directly after sampling, so that the number-average and weight-average molecular mass—relative to a calibration with polysyrene standards—could be determined by means of size exclusion chromatography (SEC):
Mn=1520 g/mol (SEC, relative to polystyrene standards)
Mw/Mn=2.7 (SEC, relative to polystyrene standards)

In a gelling batch modified relative to the above batch, magnesium perchlorate dihydrate, dissolved in methyl isobutyl ketone, was used instead of triphenylphosphine to initiate the chain synthesis reaction. Triphenylphosphine itself was not added and the metal salt catalyst was not deactivated. Samples were taken for EEW determination at 130° C. and at 30-minute intervals. Immediately after reaching an EEW of 710 g/eq (based on solids), the comparison batch gels.

2.2.2 Epoxy resin reaction product B2

In a reactor comparable to that of Example 2.2.1, 20,827 parts of epoxy resin based on bisphenol A, having an epoxy equivalent weight (EEW) of 188 g/eq, are heated to 130° C. together with 2963 parts of bisphenol A, 701 parts of butane-1,4-diol and 4542 parts of dodecylphenol, under nitrogen and with stirring.

31 parts of triphenylphosphine are added. The batch is held at 130° C. for 45 minutes so that the phenolic hydroxyl groups react. In 428 g of reaction batch, one epoxy group is found.

Subsequently, 45 parts of magnesium perchlorate dihydrate (Fluka Chemie AG)—dissolved at room temperature in 226 parts of methyl isobutyl ketone—are added, the batch is conditioned at 130° C., and synthesis is carried out up to an EEW of 747 g/eq (based on solids). 14 parts of sodium hydroxide dissolved at room temperature in 651 parts of butylglycol are then added to the reaction batch, and the epoxy resin reaction product B2 thus prepared is discharged.

2.2.3 Epoxy resin reaction product B3

In a reactor comparable to that of Example 2.2.1, 20,658 parts of epoxy resin based on bisphenol A, having an epoxy equivalent weight (EEW) of 188 g/eq, are heated to 130° C. together with 929 parts of butane-1,4-diol, 4505 parts of dodecylphenol and 3005 parts of xylene, under nitrogen and with stirring.

31 parts of triphenylphosphine are added. The batch is held at 130° C. for 50 minutes so that the phenolic hydroxyl groups react. In 312 g of reaction batch, one epoxy group is found.

Subsequently, 41 parts of magnesium perchlorate dihydrate (Fluka Chemie AG)—dissolved at room temperature in 206 parts of methyl isobutyl ketone—are added, the batch is conditioned at 130° C., and synthesis is carried out up to an EEW of 762 g/eq (based on solids). 19 parts of potassium hydroxide dissolved at room temperature in 606 parts of butyl glycol are then added to the reaction batch, and the epoxy resin reaction product B3 thus prepared is discharged.

2.2.4 Epoxy resin reaction product B4

In a reactor comparable to that of Example 2.2.1, 20,446 parts of epoxy resin based on bisphenol A, having an epoxy equivalent weight (EEW) of 188 g/eq, are heated to 130° C. together with 3686 parts of bisphenol A, 382 parts of hexane-1,6-diol and 4459 parts of dodecylphenol, under nitrogen and with stirring.

31 parts of triphenylphosphine are added. The batch is held at 130° C. for 45 minutes so that the phenolic hydroxyl groups react. In 485 g of reaction batch, one epoxy group is found.

Subsequently, 44 parts of magnesium perchlorate dihydrate (Fluka Chemie AG)—dissolved at room temperature in 221 parts of methyl isobutyl ketone—are added, the batch is conditioned at 130° C., and synthesis is carried out up to an EEW of 767 g/eq (based on solids). 20 parts of potassium hydroxide dissolved at room temperature in 711 parts of butyl glycol are then added to the reaction batch, and the epoxy resin reaction product B4 thus prepared is discharged.

2.2.5 Epoxy resin reaction product B5

In a reactor comparable to that of Example 2.2.1, 20,343 parts of epoxy resin based on bisphenol A, having an epoxy equivalent weight (EEW) of 188 g/eq, are heated to 130° C. together with 3667 parts of bisphenol A, 380 parts of neopentylglycol and 4436 parts of dodecylphenol, under nitrogen and with stirring.

30 parts of triphenylphosphine are added. The batch is held at 130° C. for 60 minutes so that the phenolic hydroxyl groups react. In 492 g of reaction batch, one epoxy group is found.

Subsequently, 68 parts of magnesium perchlorate dihydrate (Fluka Chemie AG)—dissolved at room temperature in 338 parts of methyl isobutyl ketone—are added, the batch is conditioned at 130° C., and synthesis is carried out up to an EEW of 766 g/eq (based on solids). 30 parts of potassium hydroxide dissolved at room temperature in 708 parts of butyl glycol are then added to the reaction batch, and the epoxy resin reaction product B5 thus prepared is discharged.

2.2.6 Epoxy resin reaction product B6

In a reactor comparable to that of Example 2.2.1, 20,325 parts of epoxy resin based on bisphenol A, having an epoxy equivalent weight (EEW) of 188 g/eq, are heated to 130° C. together with 3664 parts of bisphenol A, 557 parts of phenoxypropane-2,3-diol and 4433 parts of dodecylphenol, under nitrogen and with stirring.

30 parts of triphenylphosphine are added. The batch is held at 130° C. for 60 minutes so that the phenolic hydroxyl groups react. In 491 g of reaction batch, one epoxy group is found.

Subsequently, 44 parts of magnesium perchlorate dihydrate (Fluka Chemie AG)—dissolved at room temperature in 221 parts of methyl isobutyl ketone—are added, the batch is conditioned at 130° C., and synthesis is carried out up to an EEW of 775 g/eq (based on solids). 20 parts of potassium hydroxide dissolved at room temperature in 706 parts of butyl glycol are then added to the reaction batch, and the epoxy resin reaction product B6 thus prepared is discharged.

3. Preparation of an aqueous dispersion containing a cathodically depositable synthetic resin and a mixture of crosslinking agents

3.1 Dispersion C0

(Comparison example to the dispersion, described in Section 3.2, after perchlorate catalysis with subsequent catalyst deactivation (C1))

In the epoxy resin reaction product B0 prepared in Section 2.1.1 and then discharged from the reactor with cooling, an increase in the epoxy equivalent weight of 38 g/eq was found. The epoxy resin reaction product B0 was subsequently discarded.

Instead of this, the chain synthesis described in Section 2.1.1 is carried out again in a reactor equipped with a stirrer, reflux condenser, internal thermometer and inert gas inlet. For this purpose, 3623 parts of epoxy resin based on bisphenol A, with an epoxy equivalent weight (EEW) of 188 g/eq, are heated at 130° C. together with 824 parts of bisphenol A, 790 parts of dodecylphenol and 263 parts of xylene, under nitrogen and with stirring.

6 parts of triphenylphosphine are added.

The batch is held at 130° C. for 45 minutes so that the phenolic hydroxyl groups react completely. An EEW of 582 g/eq is found (based on solids).

Subsequently 15 parts of N,N-dimethylbenzylamine are added. The reaction batch is held at this temperature until the EEW has reached a value of 758 g/eq (based on solids). The epoxy resin reaction product B0 is not isolated but is immediately cooled to 115° C. with simultaneous addition of 607 parts of sec-butanol and 120 parts of butyl glycol. Then 475 parts of diethanolamine are added and cooling is continued to 90° C. One hour after the addition of amine, 577 parts of Plastilit 3060 (propylene glycol compound from BASF) are added, the batch is diluted with a mixture of 213 parts of sec-butanol and 163 parts of propylene glycol phenyl ether, and the batch is simultaneously cooled rapidly to 65° C. Then 154 parts of N,N-dimethylanimopropylamine are added, the temperature is maintained for half an hour and the batch is subsequently heated to 90° C. This temperature is maintained for 1.5 hours. The reaction batch is then cooled to 70° C. 2232 parts of crosslinking agent A1 (Section 1.1) and 1953 parts of crosslinking agent A2 (Section 1.2) and 36 parts of methyl isobutyl ketone are added to the reaction mixture, and the mixture is homogenized for 10 minutes and transferred to a dispersion vessel. Therein, 386 parts of lactic acid (88% strength in water) in 6746 parts of deionized water are added in portions with stirring. The mixture is then homogenized for 20 minutes before being additionally diluted with a further 10,817 parts of deionized water in small portions.

By distillation in vacuo, the volatile solvents are removed and then replaced by equal amounts of deionized water. The dispersion possesses the following characteristics:

Solids content: 31.9% (1 h at 130° C.)

Base content: 0.80 milliequivalent/g solids

Acid content: 0.29 milliequivalent/g solids pH: 6.2

3.2 Dispersion C1

The EEW of the epoxy resin reaction product B1 was determined immediately before use. No significant change in the EEW was found relative to the point in time at which the addition of deactivating agent was made. In a reactor equipped with a stirrer, reflux condenser, internal thermometer and inert gas inlet, 5677 parts of epoxy resin reaction product B1 are mixed with 607 parts of sec-butanol and heated to 115° C. Then 475 parts of diethanolamine are added and cooling is continued to 90° C. One hour after the addition of amine, 577 parts of Plastilit 3060 (propylene glycol compound from BASF) are added, the batch is diluted with a mixture of 213 parts of sec-butanol and 163 parts of propylene glycol phenyl ether, and the batch is simultaneously cooled rapidly to 65° C. Then 154 parts of N,N-dimethylaminopropylamine are added, the temperature is maintained for half an hour and the batch is subsequently heated to 90° C. This temperature is maintained for 1.5 hours. The reaction batch is then cooled to 70° C. 2232 parts of crosslinking agent A1 (Section 1.1) and 1953 parts of crosslinking agent A2 (Section 1.2) are added to the reaction mixture, and the mixture is homogenized for 10 minutes and transferred to a dispersion vessel. Therein, 386 parts of lactic acid (88% strength in water) in 6746 parts of deionized water are added in portions with stirring. The mixture is then homogenized for 20 minutes before being additionally diluted with a further 10,817 parts of deionized water in small portions.

By distillation in vacuo, the volatile solvents are removed and then replaced by equal amounts of deionized water. The dispersion possesses the following characteristics:

Solids content: 31.8% (1 h at 130° C.)

Base content: 0.79 milliequivalents/g solids

Acid content: 0.29 milliequivalents/g solids pH: 6.2

3.3 Dispersion C2

The EEW of the epoxy resin reaction product B2 was determined immediately before use. No significant change in the EEW was found relative to the point in time at which the addition of deactivating agent was made. In a reactor comparable to that of Example 3.2, 5525 parts of epoxy resin reaction product B2 are heated to 130° C. with stirring. 2068 parts of crosslinking agent A1 (Section 1.1) are added rapidly. The batch is conditioned at 90° C. and, one hour after the addition of crosslinker, 1001 parts of sec-butanol are added. Then 493 parts of diethanolamine are added and the batch is held further at 90° C. One hour after the addition of amine, 179 parts of Plastilit 3060 (propylene glycol compound from BASF) are added, the batch is diluted with a mixture of 327 parts of sec-butanol and 168 parts of propylene glycol phenyl ether, and the batch is simultaneously cooled rapidly to 65° C. Then 134 parts of N,N-dimethylaminopropylamine are added, the temperature is maintained for half an hour and the batch is subsequently heated to 90° C. This temperature is maintained for 1.5 hours. The reaction batch is then cooled to 70° C. 1810 parts of crosslinking agent A2 (Section 1.2) are added to the reaction mixture, and the mixture is homogenized for 10 minutes and transferred to a dispersion vessel. Therein, 449 parts of lactic acid (88% strength in water) in 6008 parts of deionized water are added in portions with stirring. The mixture is then homogenized for 20 minutes before being additionally diluted with a further 11,838 parts of deionized water in small portions.

By distillation in vacuo, the volatile solvents are removed and then replaced by equal amounts of deionized water. The dispersion possesses the following characteristics:

Solids content: 30.3% (1 h at 130° C.)

Base content: 0.76 milliequivalent/g solids

Acid content: 0.33 milliequivalent/g solids pH: 5.8

3.4 Dispersion C3

The EEW of the epoxy resin reaction product B3 was determined immediately before use. No significant change in the EEW was found relative to the point in time at which the addition of deactivating agent was made. In a reactor comparable to that of Example 3.2, 5156 parts of epoxy resin reaction product B3 are mixed with 342 parts of sec-butanol and are heated to 115° C. Then 403 parts of diethanolamine are added and the batch is cooled further to 90° C. One hour after the addition of amine, 509 parts of Plastilit 3060 (propylene glycol compound from BASF) are added, the batch is diluted with a mixture of 189 parts of sec-butanol and 146 parts of propylene glycol phenyl ether, and the batch is simultaneously cooled rapidly to 65° C. Then 151 parts of N,N-dimethylaminopropylamine are added, the temperature is maintained for half an hour and the batch is subsequently heated to 90° C. This temperature is maintained for 1.5 hours. The reaction batch is then cooled to 75° C. 1975 parts of crosslinking agent A1 (Section 1.1) and 1728 parts of crosslinking agent A2 (Section 1.2) are added to the reaction mixture, and the mixture is homogenized for 10 minutes and transferred to a dispersion vessel. Therein, 383 parts of lactic acid (88% strength in water) in 5680 parts of deionized water are added in portions with stirring. The mixture is then homogenized for 20 minutes before being additionally diluted with a further 13,338 parts of deionized water in small portions.

By distillation in vacuo, the volatile solvents are removed and then replaced by equal amounts of deionized water. The dispersion possesses the following characteristics:

Solids content: 27.8% (1 h at 130° C.)

Base content: 0.78 milliequivalent/g solids

Acid content: 0.36 milliequivalent/g solids pH: 6.2

3.5 Dispersion C4

The EEW of the epoxy resin reaction product B4 was determined immediately before use. No significant change in the EEW was found relative to the point in time at which the addition of deactivating agent was made. In a reactor comparable to that of Example 3.2, 5568 parts of epoxy resin reaction product B4 are mixed with 924 parts of sec-butanol and are heated to 115° C. Then 487 parts of diethanolamine are added and the batch is cooled further to 90° C. One hour after the addition of amine, 391 parts of Plastilit 3060 (propylene glycol compound from BASF) are added, the batch is diluted with a mixture of 324 parts of sec-butanol and 185 parts of propylene glycol phenyl ether, and the batch is simultaneously cooled rapidly to 65° C. Then 126 parts of N,N-dimethylaminopropylamine are added, the temperature is maintained for half an hour and the batch is subsequently heated to 90° C. This temperature is maintained for 1.5 hours. The reaction batch is then cooled to 75° C. 2277 parts of crosslinking agent A1 (Section 1.1) and 1992 parts of crosslinking agent A2 (Section 1.2) are added to the reaction mixture, and the mixture is homogenized for 10 minutes and transferred to a dispersion vessel. Therein, 363 parts of lactic acid (88% strength in water) in 6546 parts of deionized water are added in portions with stirring. The mixture is then homogenized for 20 minutes before being additionally diluted with a further 10,817 parts of deionized water in small portions.

By distillation in vacuo, the volatile solvents are removed and then replaced by equal amounts of deionized water. The dispersion possesses the following characteristics:

Solids content: 32.0% (1 h at 130° C.)

Base content: 0.73 milliequivalent/g solids

Acid content: 0.25 milliequivalent/g solids pH: 6.0

3.6 Dispersion C5

The EEW of the epoxy resin reaction product B5 was determined immediately before use. No significant change in the EEW was found relative to the point in time at which the addition of deactivating agent was made. In a reactor comparable to that of Example 3.2, 5459 parts of epoxy resin reaction product B5 are mixed with 905 parts of sec-butanol and are heated to 115° C. Then 477 parts of diethanolamine are added and the batch is cooled further to 90° C. One hour after the addition of amine, 575 parts of Plastilit 3060 (propylene glycol compound from BASF) are added, the batch is diluted with a mixture of 317 parts of sec-butanol and 181 parts of propylene glycol phenyl ether, and the batch is simultaneously cooled rapidly to 65° C. Then 123 parts of N,N-dimethylaminopropylamine are added, the temperature is maintained for half an hour and the batch is subsequently heated to 90° C. This temperature is maintained for 1.5 hours. The reaction batch is then cooled to 75° C. 2231 parts of crosslinking agent A1 (Section 1.1) and 1952 parts of crosslinking agent A2 (Section 1.2) are added to the reaction mixture, and the mixture is homogenized for 10 minutes and transferred to a dispersion vessel. Therein, 391 parts of lactic acid (88% strength in water) in 6572 parts of deionized water are added in portions with stirring. The mixture is then homogenized for 20 minutes before being additionally diluted with a further 10,817 parts of deionized water in small portions.

By distillation in vacuo, the volatile solvents are removed and then replaced by equal amounts of deionized water. The dispersion possesses the following characteristics:

Solids content: 32.0% (1 h at 130° C.)
Base content: 0.72 milliequivalents/g solids
Acid content: 0.25 milliequivalents/g solids
pH: 6.0

3.7 Dispersion C6

The EEW of the epoxy resin reaction product B6 was determined immediately before use. No significant change in the EEW was found relative to the point in time at which the addition of deactivating agent was made. In a reactor comparable to that of Example 3.2, 5341 parts of epoxy resin reaction product B5 are mixed with 881 parts of sec-butanol and are heated to 115° C. Then 465 parts of diethanolamine are added and the batch is cooled further to 90° C. One hour after the addition of amine, 186 parts of Plastilit 3060 (propylene glycol compound from BASF) are added, the batch is diluted with a mixture of 309 parts of sec-butanol and 176 parts of propylene glycol phenyl ether, and the batch is simultaneously cooled rapidly to 65° C. Then 120 parts of N,N-dimethylaminopropylamine are added, the temperature is maintained for half an hour and the batch is subsequently heated to 90° C. This temperature is maintained for 1.5 hours. The reaction batch is then cooled to 75° C. 2171 parts of crosslinking agent A1 (Section 1.1) and 1900 parts of crosslinking agent A2 (Section 1.2) are added to the reaction mixture, and the mixture is homogenized for 10 minutes and transferred to a dispersion vessel. Therein, 364 parts of lactic acid (88% strength in water) in 6070 parts of deionized water are added in portions with stirring. The mixture is then homogenized for 20 minutes before being additionally diluted with a further 12,017 parts of deionized water in small portions.

By distillation in vacuo, the volatile solvents are removed and then replaced by equal amounts of deionized water. The dispersion possesses the following characteristics:

Solids content: 30.0% (1 h at 130° C.)
Base content: 0.75 milliequivalent/g solids
Acid content: 0.27 milliequivalent/g solids
pH: 6.1

4. Preparation of a gray pigment paste

In accordance with EP 0 505 445 B1, Example 1.3, an organic-aqueous grinding-resin solution is prepared by reacting, in the first stage, 2598 parts of bisphenol A diglycidyl ether (epoxy equivalent weight [EEW] 188 g/eq), 787 parts of bisphenol A, 603 parts of dodecylphenol and 206 parts of butylglycol in the presence of 4 parts of triphenylphosphine at 130° C. to an EEW of 865. While the reaction batch is cooling, it is diluted with 849 parts of butylglycol and 1534 parts of D.E.R. 732 (polypropylene glycol diglycidyl ether, DOW Chemical) and is reacted further at 90° C. with 266 parts of 2,2'-aminoethoxyethanol and 212 parts of N,N-dimethylaminopropylamine. After 2 hours the viscosity of the resin solution is constant (5.3 dPa·s; 40% strength in Solvenon PM [BASF AG]; plate-cone viscometer at 23° C.). It is diluted with 1512 parts of butylglycol and the base groups are partially neutralized with 201 parts of glacial acetic acid; the resulting solution is then diluted further with 1228 parts of deionized water and discharged. In this way, a 60% strength aqueous-organic resin solution is obtained whose 10% strength dilution has a pH of 6.0. The resin solution is employed in direct form for paste preparation.

For this purpose, first 280 parts of water and 250 parts of the above-described resin solution are premixed. Then 5 parts of carbon black, 35 parts of basic lead pigment, 90 parts of extender HEWP[1], 315 parts of titanium dioxide (R 900), 5 parts of Bentone EW[2] and 20 parts of dibutyltin oxide are added. The mixture is predispersed for 30 minutes in a high-speed dissolver stirrer. Subsequently, the mixture is dispersed in a small laboratory mill (Motor Mini Mill, Eiger Engineering Ltd., Great Britain) for from 1 to 1.5 h down to a Hegmann fineness of less than or equal to 12 and is adjusted with further water to processing viscosity. A pigment paste is obtained which is stable toward separation.

1) English China Clay Int., Great Britain
2) Rheox, Germany

5. Preparation and deposition of novel electrodeposition coating materials I–VI

5.1 Preparation of the electrodeposition coating baths

Using dispersions according to Section 3., following electrodeposition coating baths I–VI are prepared, consisting of mixtures of in each case (0) 2614 parts of the dispersion C0 (Section 3.1) or
(I) 2614 parts of the dispersion C1 (Section 3.2) or
(II) 2744 parts of the dispersion C2 (Section 3.3) or
(III) 2991 parts of the dispersion C3 (Section 3.4) or
(IV) 2598 parts of the dispersion C4 (Section 3.5) or
(V) 2598 parts of the dispersion C5 (Section 3.6) or
(VI) 2771 parts of the dispersion C6 (Section 3.7) and 1300 parts of deionized water and also 25 parts of a 10% strength aqueous lactic acid solution. 646 parts of the pigment paste according to Section 4. are added with stirring to the resulting mixtures. The electrodeposition coating material thus obtained is made up to 5000 parts with deionized water.

5.2 Deposition of the electrodeposition coating baths

After aging for 10 days at room temperature, deposition is carried out on a steel test panel (zinc-phosphated metal sheet) connected as cathode with a series resistance of 150 Ω. The deposition time is 2 minutes at a bath temperature of 30° C.

The deposited coated film is rinsed with deionized water and stoved at 170° C. for 20 minutes. The resulting stoved coating films were tested.

| Electrodeposition coating bath | 5.3 Deposition results | | | | | | |
|---|---|---|---|---|---|---|---|
| | 0 | I | II | III | IV | V | VI |
| Coat thickness [μm] | 20.0 | 20.0 | 27.5 | 32.9 | 24.8 | 20.7 | 25.2 |
| at voltage [V] | 380 | 330 | 330 | 330 | 350 | 350 | 350 |
| Leveling*) | 0.5 | 0.5 | 1.0 | 1.5 | 1.0 | 1.0 | 1.0 |
| Erichsen indentation [mm] (DIN 53156) | 6.0 | 7.0 | 8.0 | 9.0 | 9.5 | 8.0 | 8.5 |
| Reverse impact [inch pound] (ASTM D 2794) | 100 | 100 | 120 | 160 | 160 | 120 | 120 |
| Crosshatch*) (DIN 50017) | 2 | 0 | 2 | 0 | 0 | 0 | 0 |
| Flexure [cm] (conical mandrel; ISO 6860) | 1 | 1 | 0 | 0 | 0 | 0 | 0 |

*)0 - best value; 5 - worst value

Crosshatch testing of the electrodeposition coating baths

For the crosshatch test the electrodeposition-coated, zinc-phosphated steel panels are overcoated with a typical topcoat, the coat applied being stoved separately. Composition of two-coat system: 20 μm electrodeposition coating 35 μm stoving topcoat (alkyd-melamine medium-solids, FD72-0782, BASF L+F)

The coat thicknesses indicated are those of the dry film.

We claim:

1. A branched epoxy resin, prepared according to a process comprising the steps of:
   (a) reacting a polyepoxide having secondary hydroxyl functionality in the presence of at least one metal salt catalyst comprising a metal cation and an anion; wherein the metal is selected from the group consisting of alkali metals, alkaline earth metals, zinc, and nickel; and further wherein the anion is selected from the group consisting of tetrafluoroborate, tetrachloroborate, hexafluoroantimonate, hexachloroantimonate, hexafluorophosphate, perchlorate, and periodate anions; and
   (b) adding at least one metal hydroxide deactivating agent to the reaction mixture when a desired degree of branching is obtained and when a residual of at least 0.6% by weight of epoxide groups, based on the overall weight of the epoxy resin reaction product, remain unreacted.

2. A branched epoxy resin according to claim 1, wherein the reaction of step (a) is carried out in the presence of hydroxy compounds selected from the group consisting of aliphatic hydroxy compounds, alicyclic hydroxy compounds, and mixtures thereof, with the proviso that the hydroxy compounds do not exceed 60% by weight, based on the overall weight of branched epoxy resin product.

3. A branched epoxy resin according to claim 2, wherein the hydroxy compounds have on average two or less hydroxyl groups per molecule and molecular weight of less than 9000 g/mol.

4. A branched epoxy resin according to claim 2, wherein the hydroxy compounds are selected from polyetherdiols.

5. A branched epoxy resin according to claims 1 or 16, wherein the polyepoxide has an average epoxide equivalent weight of from 140 to 5000 g/eq.

6. A branched epoxy resin according to claim 1, wherein the catalyst anion is selected from the group consisting of tetrafluoroborate and perchlorate anions.

7. A branched epoxy resin according to claim 1, wherein the catalyst cation metal is selected from the group consisting of alkaline earth metals and zinc.

8. A branched epoxy resin according to claim 1, wherein the catalyst is selected from the group consisting of alkaline earth metal perchlorates, zinc perchlorates, and mixtures thereof.

9. A branched epoxy resin according to claim 1, wherein the metal hydroxide is selected from the group consisting of lithium hydroxide, sodium hydroxide, potassium hydroxide, cesium hydroxide, magnesium hydroxide, calcium hydroxide, strontium hydroxide, barium hydroxide, aluminum hydroxide, tin hydroxide, lead hydroxide, bismuth hydroxide, zinc hydroxide, chromium hydroxide, manganese hydroxide, iron hydroxide, nickel hydroxide, and mixtures thereof.

10. A branched epoxy resin according to claim 1, wherein the metal hydroxide is selected from the group consisting of sodium hydroxide, potassium hydroxide, and mixtures thereof.

11. A branched epoxy resin according to claim 1, wherein the deactivating agent is added in an amount sufficient to supply from about 0.5 to about 5.0 mol hydroxyl anions per mole of catalyst anion.

12. A branched epoxy resin according to claim 1, wherein the deactivating agent is added in an amount sufficient to supply from about 1.4 to about 3.0 mol hydroxyl anions per mole of catalyst anion.

13. A process for preparing a branched epoxy resin, comprising the steps of:
   (a) reacting a polyepoxide having secondary hydroxyl functionality in the presence of at least one metal salt catalyst comprising a metal cation and an anion; wherein the metal is selected from the group consisting of alkali metals, alkaline earth metals, zinc, and nickel; and further wherein the anion is selected from the group consisting of tetrafluoroborate, tetrachloroborate, hexafluoroantimonate, hexachloroantimonate, hexafluorophosphate, perchlorate, and periodate anions; and (b) adding at least one metal hydroxide deactivating agent to the reaction mixture when a desired degree of branching is obtained and when a residual of at least 0.6% by weight of epoxide groups, based on the overall weight of the epoxy resin reaction product, remain unreacted.

* * * * *